(12) United States Patent
Narumi et al.

(10) Patent No.: US 7,106,013 B2
(45) Date of Patent: Sep. 12, 2006

(54) MOTOR DRIVE APPARATUS DRIVING 3-PHASE BRUSHLESS MOTOR WITHOUT USING HALL SENSOR

(75) Inventors: Satoshi Narumi, Itami (JP); Hiroyuki Tamagawa, Itami (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/344,082

(22) Filed: Feb. 1, 2006

(65) Prior Publication Data

US 2006/0170383 A1    Aug. 3, 2006

(30) Foreign Application Priority Data

Feb. 1, 2005    (JP) ............................. 2005-025048

(51) Int. Cl.
*H02P 7/06* (2006.01)
(52) U.S. Cl. .................. 318/254; 318/138; 318/244; 318/246; 318/700; 318/737
(58) Field of Classification Search ............... 318/244, 318/246, 700, 737, 254, 138
See application file for complete search history.

(56) References Cited

U.S. PATENT DOCUMENTS

| | | | | |
|---|---|---|---|---|
| 4,900,993 A | * | 2/1990 | Yasohara et al. ........... 318/254 |
| 5,473,232 A | * | 12/1995 | Tamaki et al. .............. 318/439 |
| 5,592,058 A | * | 1/1997 | Archer et al. ............... 318/254 |
| 5,939,850 A | * | 8/1999 | Kondoh ...................... 318/254 |
| 6,121,736 A | * | 9/2000 | Narazaki et al. ............ 318/254 |
| 6,448,725 B1 | * | 9/2002 | Cho et al. ................... 318/254 |
| 6,555,977 B1 | * | 4/2003 | Du et al. .................... 318/254 |
| 6,806,663 B1 | * | 10/2004 | Kusaka et al. .............. 318/254 |
| 2003/0067278 A1 | * | 4/2003 | Nakamura et al. .......... 318/254 |
| 2005/0104545 A1 | * | 5/2005 | Kikuchi ...................... 318/254 |

FOREIGN PATENT DOCUMENTS

JP        2003-047280        2/2003

* cited by examiner

*Primary Examiner*—Rita Leykin
(74) *Attorney, Agent, or Firm*—McDermott Will & Emery LLP

(57) ABSTRACT

A motor drive apparatus includes a comparison circuit comparing voltages of 3-phase coil terminals and the voltage of a neutral point terminal of a 3-phase brushless motor to determine which voltage is higher/lower, a zero ampere current detection circuit detecting, based on the comparison result by the comparison circuit, that the coil current of a position detection phase becomes 0 A, a position detection circuit detecting a zero cross point of the voltage of the position detection phase based on the comparison result by the comparison circuit after the coil current becomes 0 A. Therefore, the zero cross point can be accurately detected without introducing a mask period.

5 Claims, 7 Drawing Sheets

MOTOR DRIVE APPARATUS DRIVING 3-PHASE BRUSHLESS MOTOR WITHOUT USING HALL SENSOR

BACKGROUND OF THE INVENTION

1. Field of the Invention

The present invention relates to a motor drive apparatus, and particularly to a motor drive apparatus driving a 3-phase brushless motor without using a Hall sensor.

2. Description of the Background Art

Conventionally, a motor drive apparatus which drives a 3-phase brushless motor without using a Hall sensor is known. In this motor drive apparatus, as the rotor rotates, its position is detected using not a Hall sensor but an induced voltage generated in a coil of a stator by the rotation of the rotor. Based on the detection result, 3-phase PWM voltages 120° out of phase with each other are applied to 3-phase coils (for example, see Japanese Patent Laying-Open No. 2003-047280).

More specifically, in such a motor drive apparatus, the current supply to a coil of a position detection phase is timed, as prescribed, to be interrupted, and a zero cross point of a coil terminal voltage of the position detection phase is detected after a lapse of a certain mask period. Based on the detection result, the 3-phase PWM voltages are then applied to the 3-phase coils. Although the coil current should be 0 A in order to detect the zero cross point of the coil terminal voltage, the coil current cannot immediately become 0 A even if the current supply to the coil is interrupted. Therefore, the certain mask period must be introduced.

On the other hand, when the 3-phase brushless motor is driven quietly without decreasing its rotation efficiency, an electrical angle of each phase when current conducts should be brought from 120° close to 180°. This causes the possible length of the mask period to be shortened. In addition, an increase in the coil constant of the motor causes the attenuation of the coil current to be slowed down. Therefore, the coil current cannot become 0 A by the time of the detection of the zero cross point. In this case, the zero cross point cannot be accurately detected, so that it becomes difficult to control the motor.

SUMMARY OF THE INVENTION

Therefore, an object of the present invention is to provide a motor drive apparatus capable of accurately detecting a zero cross point.

A motor drive apparatus according to the present invention is a motor drive apparatus which drives a 3-phase brushless motor without using a Hall sensor, and comprises an output circuit applying, in response to a PWM signal, 3-phase PWM voltages out of phase with each other to 3-phase coil terminals of the 3-phase brushless motor, respectively, a comparison circuit comparing each voltage of the 3-phase coil terminals and the voltage of a neutral point of the 3-phase coils to determine which voltage is higher/lower, a current detection circuit detecting, based on the comparison result by the comparison circuit, that the coil current of a position detecting phase becomes 0 A, a position detection circuit detecting a zero cross point of the voltage of the position detection phase based on the comparison result by the comparison circuit in response to the fact that the current detection circuit detects that the coil current of the position detection phase becomes 0 A, a current interruption circuit interrupting the current flowing into the coil of the next position detection phase after a lapse of a predetermined time period since the zero cross point was detected by the position detection circuit, and a signal generation circuit generating a PWM signal based on the detection result by the position detection circuit.

In the motor drive apparatus according to the present invention, the zero cross point of the voltage of the position detection phase is detected after detecting that the coil current of the position detection phase actually becomes 0 A. Therefore, the zero cross point can be accurately detected without introducing a mask period.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
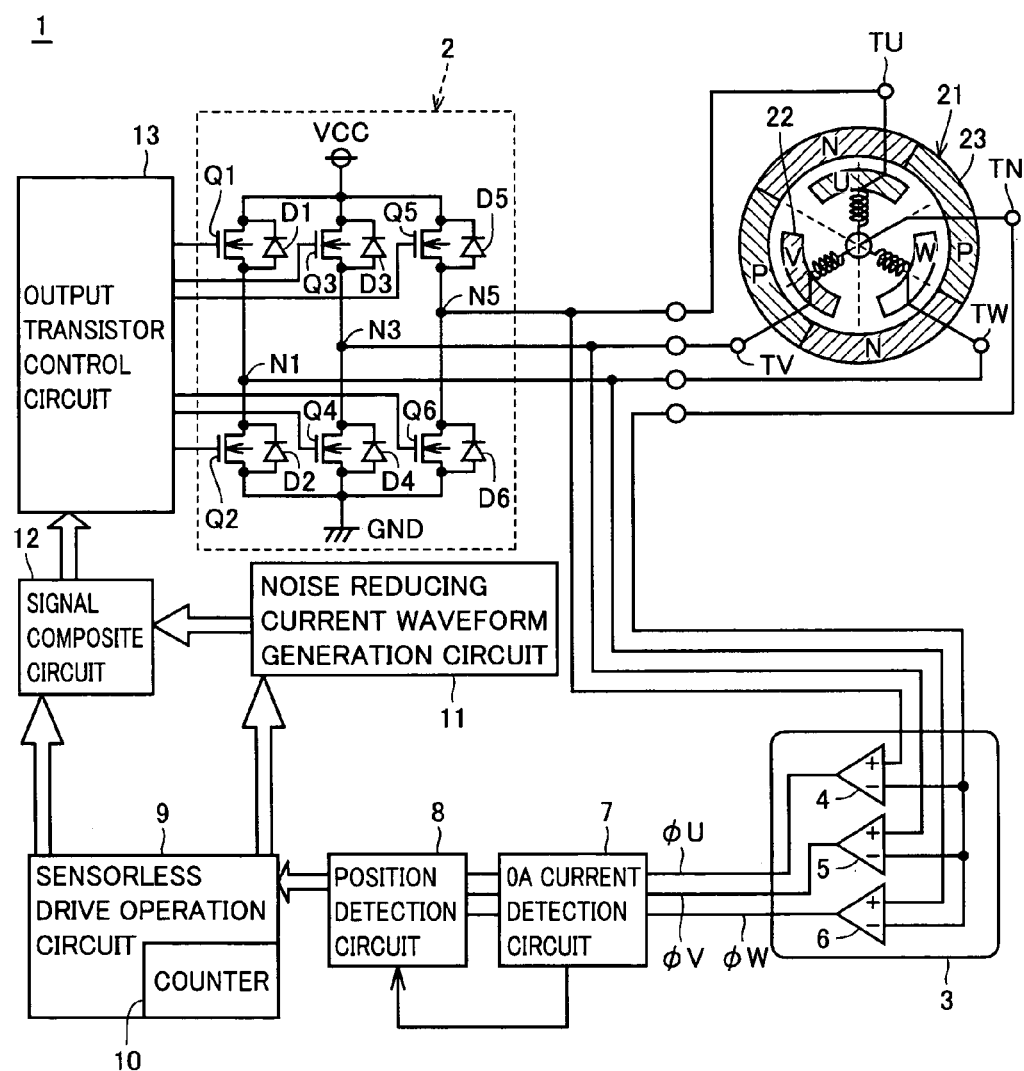
FIG. 1 is a circuit block diagram showing a configuration of a motor drive apparatus according to one embodiment of the present invention.

FIG. 1 is a block diagram showing a configuration of a motor drive apparatus 1 according to one embodiment of the present invention. In FIG. 1, motor drive apparatus 1 includes an output circuit 2, a comparison circuit 3, a zero ampere current (0 A) detection circuit 7, a position detection circuit 8, a sensorless drive operation circuit 9, a noise reducing current waveform generation circuit 11, a signal composite circuit 12 and an output transistor control circuit 13, and drives a 3-phase brushless motor 21 without using a Hall sensor. Motor drive apparatus 1 is formed as one IC.

3-phase brushless motor 21 has a stator 22 and a rotor 23 rotatably provided threrearound. Stator 22 includes Y-connected coils of an U-phase, a V-phase and a W-phase. One ends of the coils of the U-phase, the V-phase and the W-phase are connected to coil terminals TU, TV, TW of the U-phase, the V-phase and the W-phase, respectively, and the other ends are connected to a neutral point terminal TN. In rotor 23, more than one N-pole and more than one P-pole are alternately placed to provide a plurality of (four in the figure) poles. When 3-phase PWM voltages 120° out of phase with each other are applied to the coils of the U-phase, the V-phase and the W-phase, respectively, a revolving field is produced to rotate rotor 23 in accordance with the revolving field. Motor 21 is, for example, used as a spindle motor which rapidly rotates a hard disk of a personal computer.

Output circuit 2 includes N-channel MOS transistors Q1 to Q6 and diodes D1 to D6. N-channel MOS transistors Q1 and Q2, Q3 and Q4, as well as Q5 and Q6 are connected in series between lines of a power-supply voltage VCC and lines of a ground voltage GND, respectively. Nodes N1, N3, N5 between N-channel MOS transistors Q1 and Q2, Q3 and Q4, as well as Q5 and Q6 are connected to coil terminals TU, TV, TW of the U-phase, the V-phase and the W-phase of 3-phase brushless motor 21, respectively. Diodes D1, D3 and D5 are connected between nodes N1, N3, N5 and the lines of power-supply voltage VCC, respectively. Diodes D2, D4 and D6 are connected between the lines of ground voltage GND and nodes N1, N3, N5, respectively. N-channel MOS transistors Q1 to Q6 are turned on/off at a predetermined timing to allow direct-current voltage VCC to be converted to the 3-phase PWM voltages. It is noted that, instead of the N-channel MOS transistor, a P-channel MOS transistor can be used to apply a signal having a phase opposite the signal applied to the gate of the N-channel MOS transistor or an inverted signal to the gate of the P-channel MOS transistor.

Comparison circuit 3 includes three comparators 4 to 6. Positive (+) terminals of comparators 4 to 6 are connected to coil terminals TU, TV, TW of 3-phase brushless motor 21, respectively. Negative (−) terminals of comparators 4 to 6 are connected together to neutral point terminal TN of 3-phase brushless motor 21. An output signal φU of comparator 4 becomes a "H" level if the voltage of coil terminal TU is above the voltage of neutral point terminal TN, and becomes a "L" level if the voltage of coil terminal TU is below the voltage of neutral point terminal TN.

An output signal φV of comparator 5 becomes the "H" level if the voltage of coil terminal TV is above the voltage of neutral point terminal TN, and becomes the "L" level if the voltage of coil terminal TV is below the voltage of neutral point terminal TN. An output signal φW of comparator 6 becomes the "H" level if the voltage of coil terminal TW is above the voltage of neutral point terminal TN, and becomes the "L" level if the voltage of coil terminal TW is below the voltage of neutral point terminal TN.

Zero ampere current detection circuit 7 detects, based on output signals φU, φV, φW of comparators 4 to 6, that a coil current of a position detection phase actually becomes 0 A. The position detection phase refers to a phase targeted for position detection of the U-phase, the V-phase and the W-phase, and sequentially changes in the order of the U-phase, the V-phase and the W-phase.

Position detection circuit 8 detects a zero cross point of each voltage of terminal TU, TV or TW of the position detection phase based on output signals φU, φV, φW of comparators 4 to 6 in response to the fact that zero ampere current detection circuit 7 detects that the coil current of the position detection phase becomes 0 A. Position detection circuit 8 then outputs a position detection signal showing the detection result.

Sensorless drive operation circuit 9 generates a PWM signal based on the position detection signal from position detection circuit 8 while incrementing a built-in counter 10, setting an initial value, and performing a setting and a resetting. Sensorless drive operation circuit 9 controls the PWM signal to interrupt the current of the position detection phase, as optimally timed. Counter 10 is shared with zero ampere current detection circuit 7, noise reducing current waveform generation circuit 11 and signal composite circuit 12.

Noise reducing current waveform generation circuit 11 is synchronized with the PWM signal generated in sensorless drive operation circuit 9 to generate a current waveform for reducing noise of 3-phase brushless motor 21. Signal composite circuit 12 combines the PWM signal generated in sensorless drive operation circuit 9 and the current waveform generated in noise reducing current waveform generation circuit 11. Output transistor control circuit 13 operates in response to the output signal of signal composite circuit 12 to control each of transistors Q1 to Q6 of output circuit 2 to turn on/off. This causes 3-phase PWM voltages to be supplied from output circuit 2 to 3-phase brushless motor 21 to thereby rotate rotor 23.

FIGS. 2(a), (b) and (c) are time charts showing waveforms of drive voltages VDU, VDV, VDW of the coils of the U-phase, the V-phase and the W-phase, respectively. FIGS. 2(d), (e) and (f) are time charts showing waveforms of induced voltages VIU, VIV, VIW of the coils of the U-phase, the V-phase and the W-phase, respectively. FIGS. 2(g), (h) and (i) are time charts showing waveforms of drive currents IU, IV, IW of the coils of the U-phase, the V-phase and the W-phase, respectively.

In FIGS. 2(a) to (i), com 1 to com 6 show the status of the drive current flowing into 3-phase coils for an electrical angle of 360°. In com 1, the drive current flows from the coil of the U-phase through the neutral point to the coil of the V-phase. In com 2, it flows from the coil of the U-phase through the neutral point to the coil of the W-phase. In com 3, it flows from the coil of the V-phase through the neutral point to the coil of the W-phase. In com 4, it flows from the coil of the V-phase through the neutral point to the coil of the U-phase. In com 5, it flows from the coil of the W-phase through the neutral point to the coil of the U-phase. In com 6, it flows from the coil of the W-phase through the neutral point to the coil of the V-phase. In this way, the change in the path of the drive current causes a revolving field to be produced.

Drive voltages VDU, VDV, VDW are supplied to 3-phase coil terminals TU, TV, TW of a 3-phase brushless motor 23, respectively, by turning on/off each of N-channel MOS transistors Q1 to Q6 of output circuit 2. When rotor 23 is rotated, induced voltages VIU, VIV, VIW are generated in 3-phase coils. The position of rotor 23 can be detected by detecting zero cross points of induced voltages VIU, VIV, VIW. Since the phases of induced voltages VIU, VIV, VIW appearing when both transistors Q1, Q3, Q5 on the power-supply side and transistors Q2, Q4, Q6 on the ground side in output circuit 2 are turned off, and the phases of drive voltages VDU, VDV, VDW are identical to each other, the position of rotor 23 can be detected by detecting the zero cross points of drive voltages VDU, VDV, VDW. Rotor 23 can be rotated by applying drive voltages VDU, VDV, VDW to 3-phase coils depending on the position of rotor 23.

In order to detect the zero cross points of drive voltages VDU, VDV, VDW, it is necessary to interrupt drive currents IU, IV, IW to bring them to 0 A prior to the detection. For example, in order to detect a zero cross point C of drive voltage VDV in com 5, it is necessary to stop applying drive voltage VDV to interrupt drive current IV to thereby bring drive current IV to 0 A prior to the detection (in an area B). The current cannot immediately become 0 A even if the current of the coil is interrupted. Therefore, in the present invention, zero ampere current detection circuit 7 detects that the coil current of the position detection phase becomes 0 A, and thereafter, position detection circuit 8 detects the zero cross point of the voltage of the position detection phase.

A method of detecting that the coil current of the position detection phase becomes 0 A is then described, where the position detection phase is the V-phase. In an area A in FIG. 2, as shown in FIG. 3(a), N-channel MOS transistors Q2, Q3 of output circuit 2 are turned on to cause drive current IV to flow from the line of power-supply voltage VCC through N-channel MOS transistor Q3, V-phase coil terminal TV, a V-phase coil, the neutral point, a U-phase coil, U-phase coil terminal TU and N-channel MOS transistor Q2 to the line of ground voltage GND. Current IV is flowing into the V-phase coil at this time, so that the zero cross point cannot be detected by comparator 5 operating within the motor drive voltage.

Figure 2:
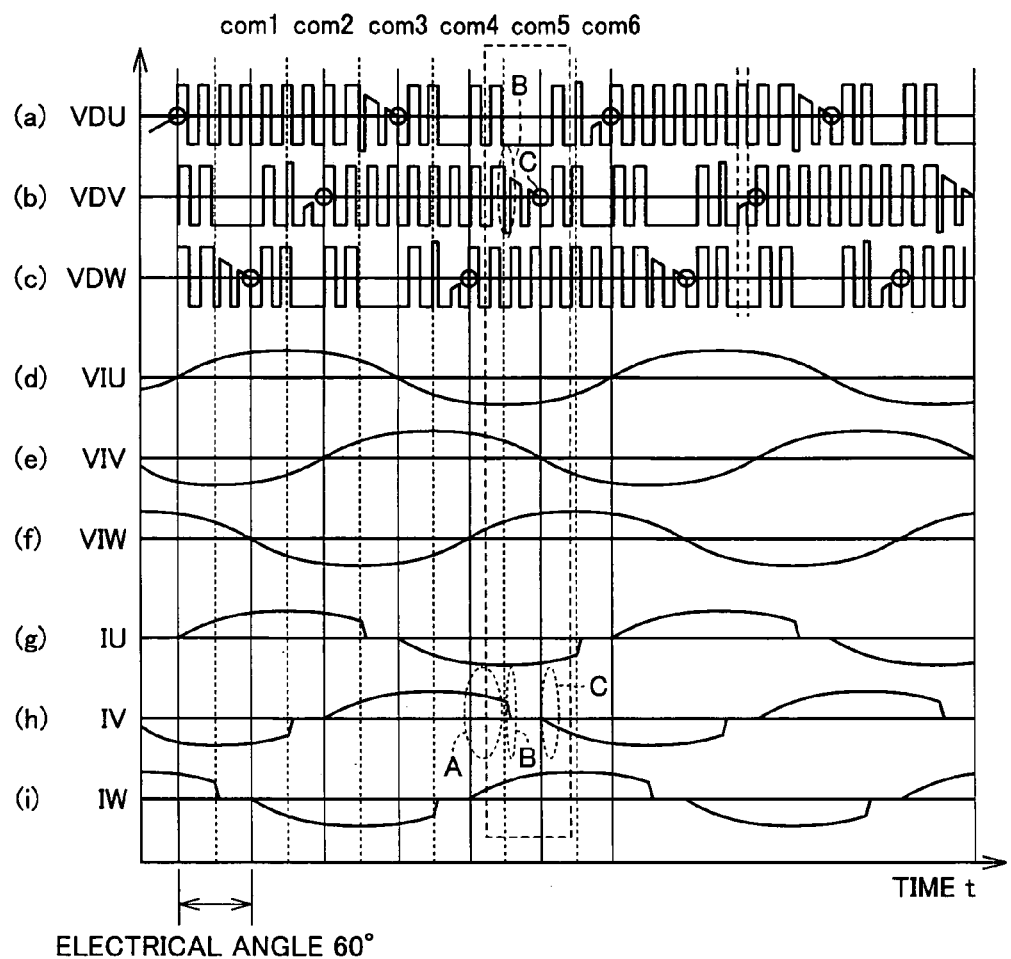
FIG. 2 is a time chart showing an operation of the motor drive apparatus shown in FIG. 1.
Figure 3:
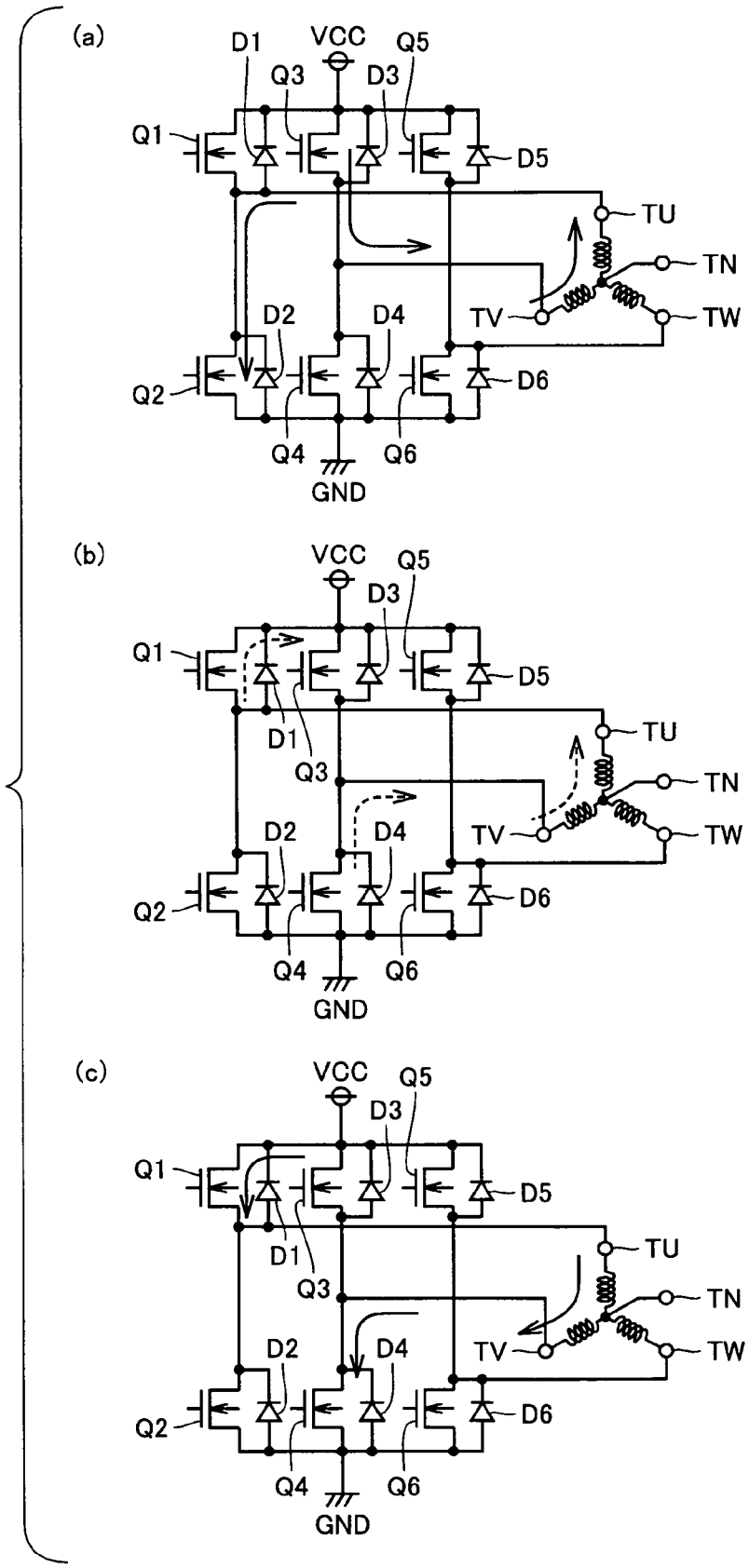
FIG. 3 is a circuit diagram showing an operation of a zero ampere current detection circuit shown in FIG. 1.

Accordingly, as shown in the area B in FIG. 2, N-channel MOS transistors Q2, Q3 are turned off to interrupt drive current IV. Drive current IV cannot immediately become 0 A even if the supply of drive current IV is interrupted. As shown in FIG. 3(b), a current of the same value as the current having flown until then flows from the line of ground voltage GND through diode D4, V-phase coil terminal TV, the V-phase coil, the neutral point, the U-phase coil, U-phase coil terminal TU and diode D1 to the line of power-supply voltage VDD.

Then, with reference to the neutral point, the voltage of V-phase coil terminal TV is negative, and output signal φV of comparator 5 is the "L" level. A current I0 flowing to the V-phase coil is I=0 A in a static state according to the following expression (1).

$$I = [\exp(-t \cdot R/L) - 1] \cdot E/R + I0 \cdot \exp(-t \cdot R/L) \quad (1),$$

wherein R is a resistance value of the V-phase coil, L is an inductance of the V-phase coil, and E is one half of voltage VCC.

When this current I becomes 0 A, induced voltage VIV of the V-phase coil brings the output signal of comparator 5 to the "H" level. Therefore, when drive current IV flows from V-phase coil terminal TV to the neutral point, by detecting the moment when output signal φV of comparator 5 rises from the "L" level to the "H" level, it becomes possible to detect the moment when current I becomes 0 A. When current IV of the V-phase coil becomes 0 A, zero cross point C of a V-phase voltage is detected. Upon detecting zero cross point C of the V-phase voltage, as shown in FIG. 3(c), N-channel MOS transistors Q1, Q4 are turned on to resume supplying current to the V-phase coil.

Furthermore, when N-channel MOS transistors Q1, Q4 are turned off in the state shown in FIG. 3(c), the current flows from the line of ground voltage GND through diode D2, U-phase coil terminal TU, the U-phase coil, the neutral point, the V-phase coil, V-phase coil terminal TV and diode D3 to the line of power-supply voltage VCC. Then, with reference to the neutral point, the voltage of V-phase coil terminal TV is positive, and output signal φV of comparator 5 is the "H" level. Current I flowing to the V-phase coil and the U-phase coil is attenuated according to the above-described expression (1). When current I becomes 0 A, induced voltage VIV of the V-phase coil brings output signal φV of comparator 5 to the "L" level. Therefore, when drive current IV flows from the neutral point to V-phase coil terminal TV, by detecting the moment when output signal φV of comparator 5 falls from the "H" level to the "L" level, it becomes possible to detect the moment when current I becomes 0 A. When the U-phase and the W-phase are selected as the position detection phase, the results are the same as in the case of the V-phase, and therefore, the description will not be repeated here.

Figure 4:
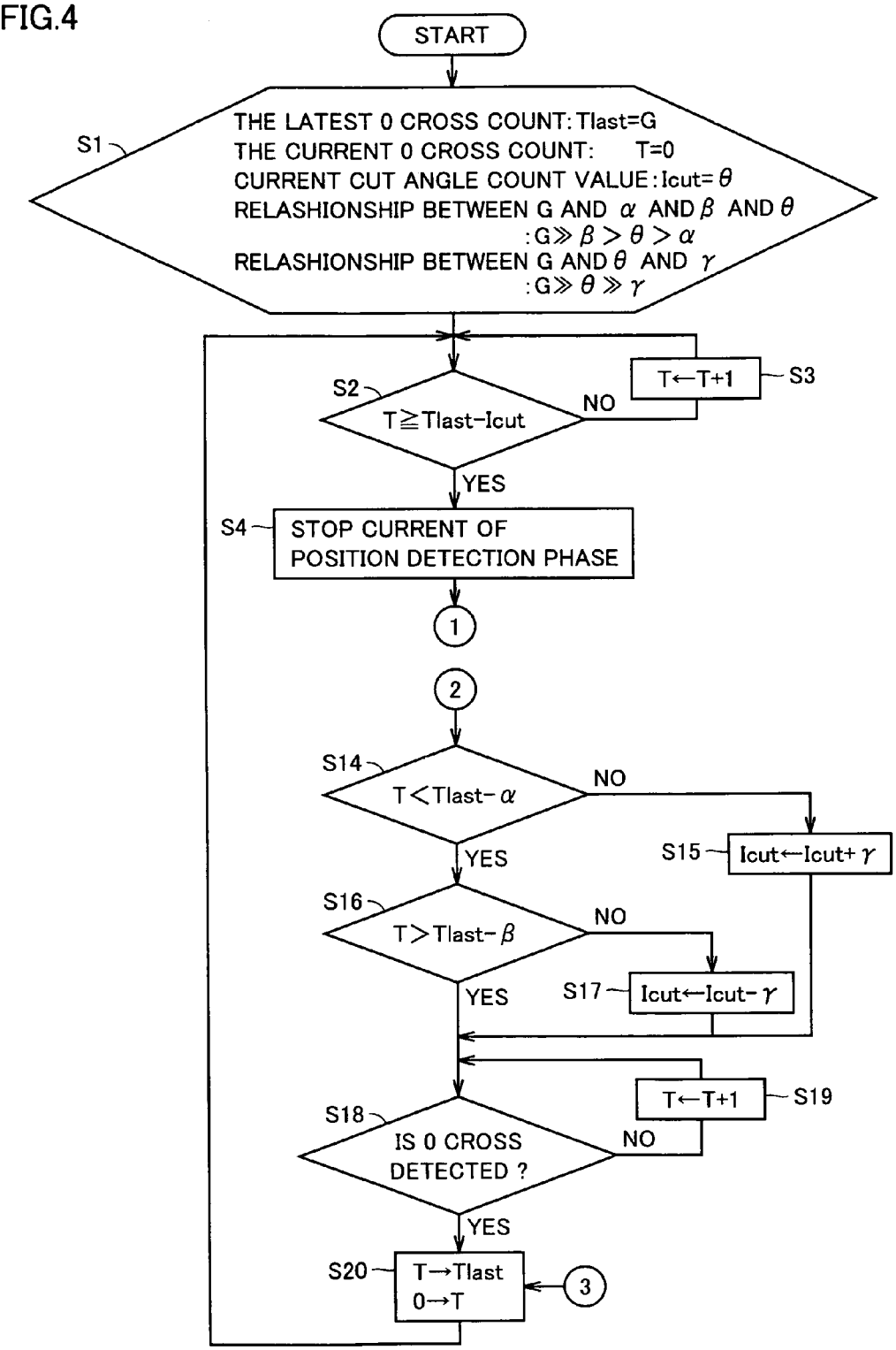
FIG. 4 is a flowchart showing a portion of the operation of the motor drive apparatus shown in FIG. 1.
Figure 5:
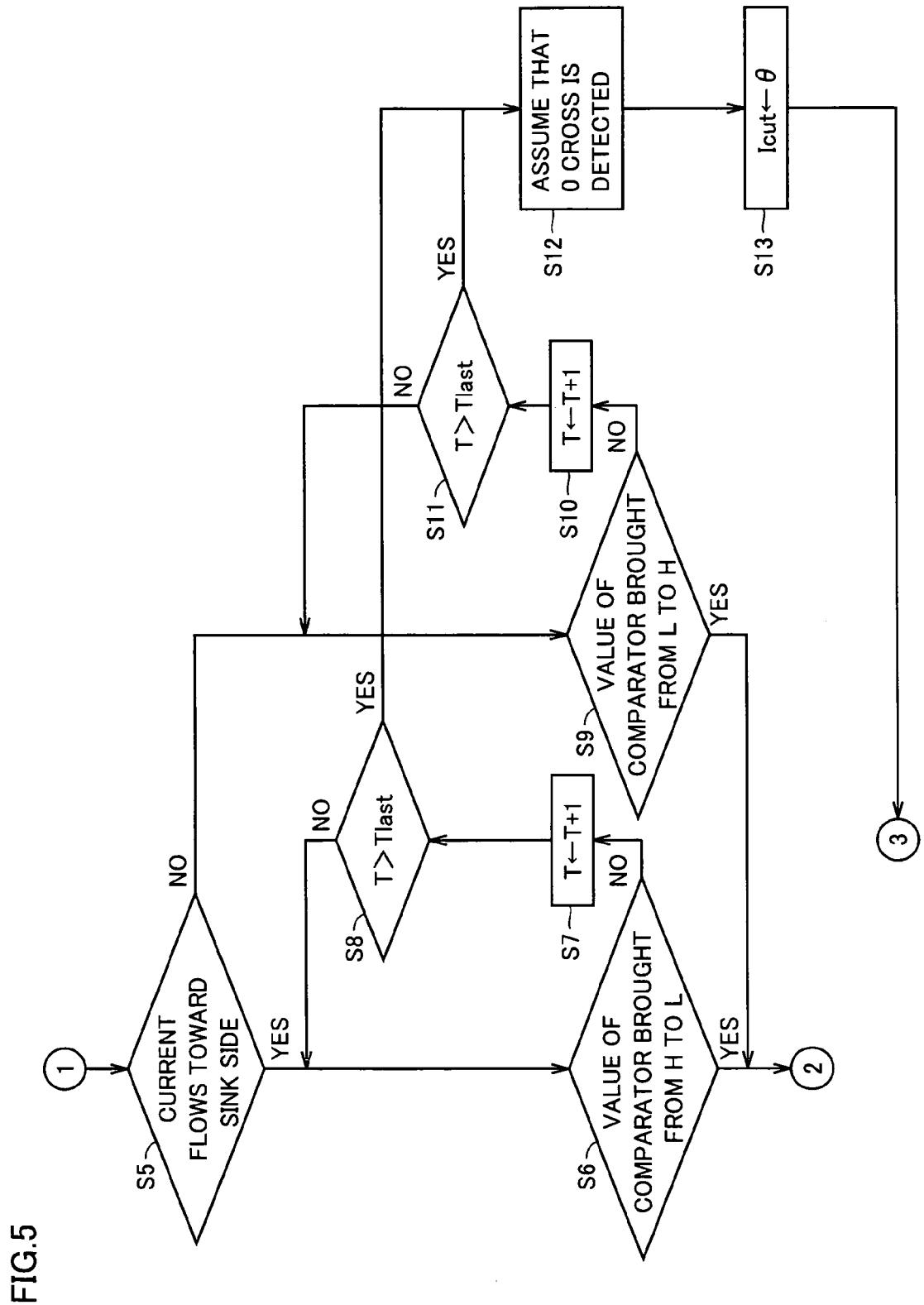
FIG. 5 is a flowchart showing another portion of the operation of the motor drive apparatus shown in FIG. 1.

FIGS. 4 and 5 are flow charts showing major operations of zero ampere current detection circuit 7, position detection circuit 8 and sensorless drive operation circuit 9 shown in FIG. 1. Assuming that the position detection phase is a V-phase, waveforms of drive current IV and drive voltage VDV of the V-phase coil, and output signal φV of comparator 5 are shown in FIG. 6.

Figure 6:
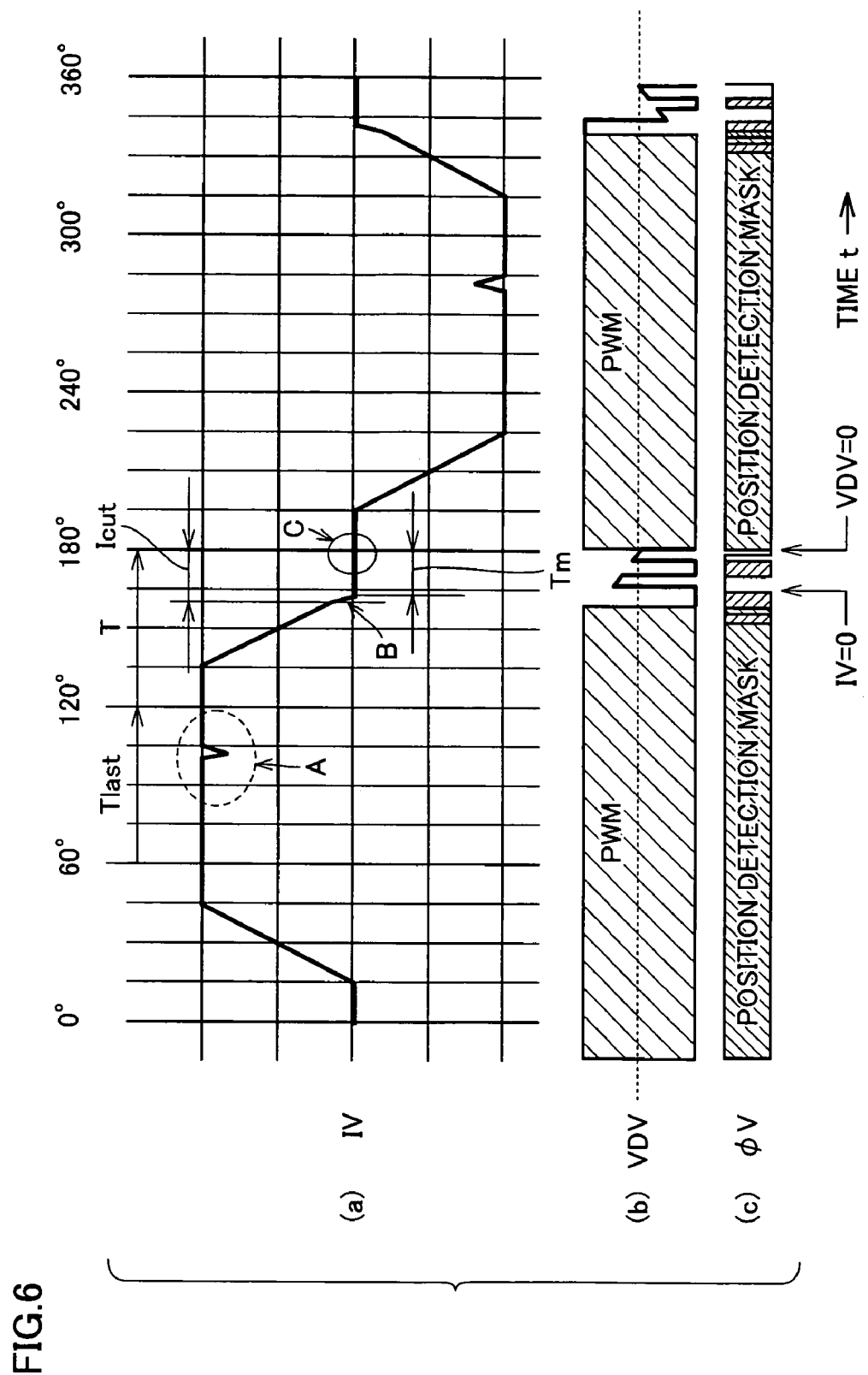
FIG. 6 is a time chart showing the operation of the motor drive apparatus shown in FIGS. 4 and 5.

In FIGS. 4 to 6, in step S1, it is assumed that a latest zero cross count (the count between electrical angles of 60° and 120° in FIG. 6) is Tlast, a current count T (an electrical angle of 120° in FIG. 6) is 0, and a count value of a current cut angle is Icut. In step S2, a decision is made as to whether or not count T of counter 10 is equal to or larger than Tlast−Tcut. If not, count T is incremented (by +1) in step S3 to return to step 2. If so, drive current IV of the phase detection phase, that is, the V-phase is interrupted in step S4.

In step S5, a decision is made as to whether coil current IV of the V-phase which is a position detection phase is directed to a SINK side (whether coil current IV flows from the neutral point to coil terminal TV). If so, the process proceeds to step S6, and if not, the process proceeds to step S9.

In step S6, a decision is made as to whether output signal φV of comparator 5 falls from the "H" level to the "L" level (whether coil current IV becomes 0 A). If so (if coil current IV becomes 0 A), the process proceeds to step S14, and if not (if coil current IV does not become 0 A), the process proceeds to step S7. In step S7, count T is incremented. In step S8, a decision is made as to whether or not count T is greater than Tlast. If not, the process is returned to step S6, and if so, the process proceeds to step S12.

In step S9, a decision is made as to whether output signal φV of comparator 5 rises from the "L" level to the "H" level (whether coil current IV becomes 0 A). If so (if coil current IV becomes 0 A), the process proceeds to step S14, and if not (if coil current IV does not become 0 A), the process proceeds to step S10. In step S10, count T is incremented. In step S11, a decision is made as to whether or not count T is greater than Tlast. If not, the process is returned to step S9, and if so, the process proceeds to step S12.

In step S12, although the zero cross point is not actually detected for some reasons, it is assumed, in order to continue to operate motor 21, that the zero cross point is detected. In step S13, the process proceeds to step S20 in FIG. 4 while maintaining the value of Icut to be θ.

In step S14, a decision is made as to whether or not count T is less than Tlast−α. If not, as coil current IV is too slow in becoming 0 A, the value of Icut is increased by y in step S115, and if so, the process proceeds to step S16. In step S16, a decision is made as to whether or not count T is greater than Tlast−β (though Tlast>>β>θ>α, and β>>γ). If not, as coil current IV is too fast in becoming 0 A, the value of Icut is decreased by γ in step S17, and if so, the process proceeds to step S18. By performing steps S14 to S17, the timing to interrupt coil current IV is optimized, and coil current IV is interrupted as timed to coincide with coil current IV naturally becoming 0 A. This prevents skews of coil currents IU, IW of the U-phase and the W-phase to thereby allow the noise of motor 21 to be reduced. It is noted that, in FIG. 6, coil current IV is interrupted before it naturally becomes 0 A (area B), and therefore, area A of coil current IV is skewed to cause noise.

In step S18, a decision is made as to whether or not there is a zero cross point of coil drive voltage VDV (whether output signal φV of comparator 5 falls from the "H" level to the "L" level). If not, count T is incremented in step S19 to return to step S18. If so, the process proceeds to step S20. In step S20, count T in the case where there is a zero cross point is set as a new Tlast, and count T is reset to 0 to return to step S2.

In the present embodiment, the current supply to the coil of the position detection phase is interrupted as timed, as predetermined (T=Tlast−Icut) to detect that the coil current becomes actually 0 A, and thereafter, a zero cross point of the voltage of the position detection phase is detected. Therefore, the zero cross point can be accurately detected without setting a mask period.

In addition, the timing to interrupt the current supply to the coil is adjusted to interrupt the current supply as timed to coincide with the coil current naturally becoming 0 A. Thus, it becomes possible to prevent skew from occurring in coil currents of other phases by forcefully interrupting the current supply, and thereby to prevent noise from occurring.

Figure 7:
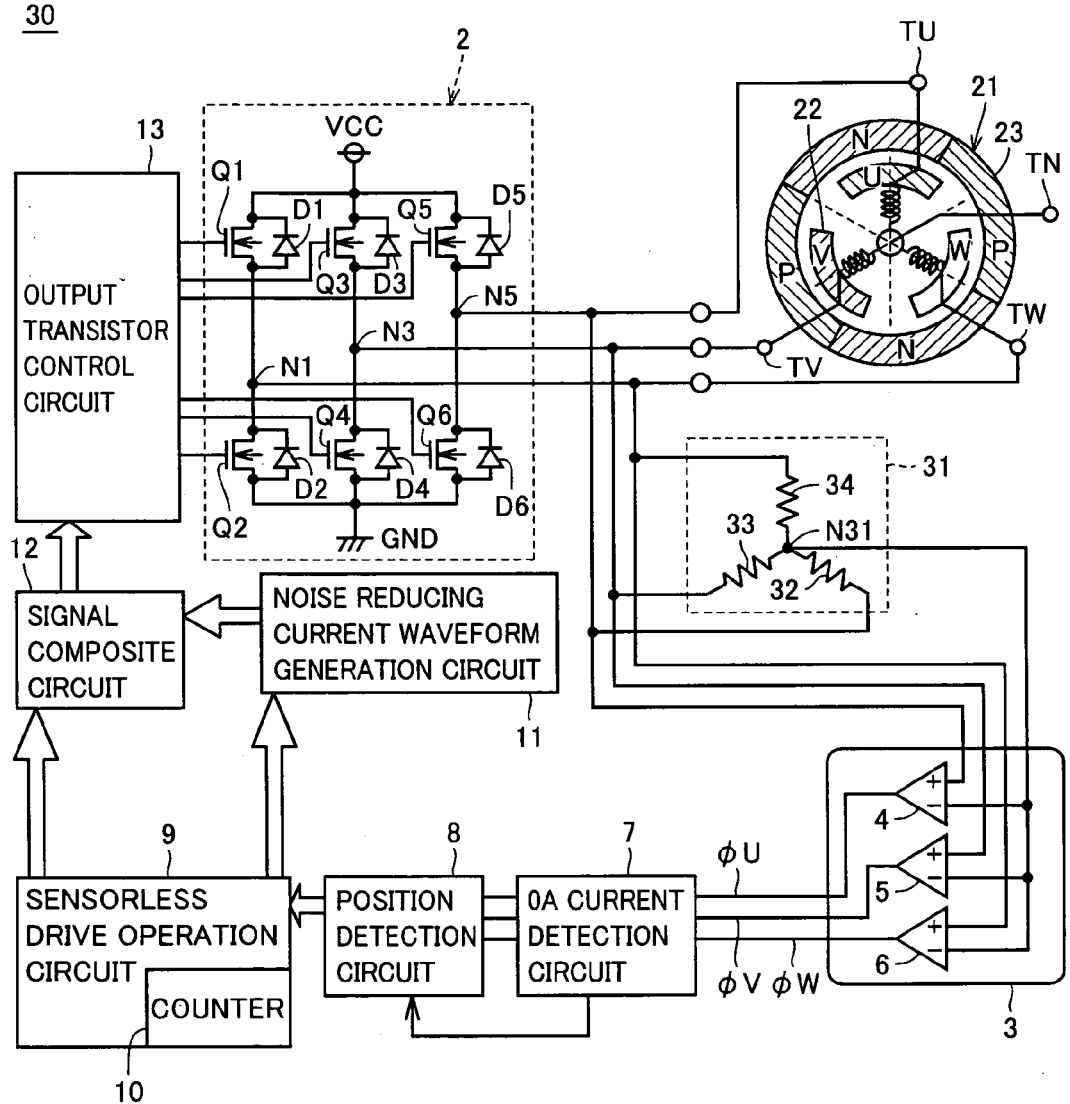
FIG. 7 is a circuit block diagram showing a modification of the present embodiment.

FIG. 7 is a circuit block diagram showing a modification of the present embodiment. In FIG. 7, a motor drive apparatus 30 is different from motor drive apparatus 1 in FIG. 1 in that a neutral point voltage generation circuit 31 is added. Neutral point voltage generation circuit 31 includes three resistance elements 32 to 34 having the same resistance value. One terminals of resistance elements 32 to 34 are connected to three coil terminals TU, TV, TW of 3-phase brushless motor 21, respectively. The other terminals of resistance elements 32 to 34 are commonly connected to a node N31. The same voltage as that in the neutral point of 3-phase coils appears on node N31. Node N31 is connected to one terminals of comparators 4 to 6. In this modification, it is possible to achieve the same effect as that in motor drive apparatus 1 in FIG. 1, and, in addition, one of the wirings between motor 21 and the motor drive apparatus can be eliminated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor drive apparatus driving a 3-phase brushless motor without using a Hall sensor, comprising
    an output circuit applying 3-phase PWM voltages out of phase with each other to 3-phase coil terminals of said 3-phase brushless motor in response to a PWM signal,
    a comparison circuit comparing each voltage of said 3-phase coil terminals and a voltage of a neutral point of 3-phase coils to determine which voltage is higher/lower,
    a current detection circuit detecting, based on a comparison result by said comparison circuit, that a coil current of a position detection phase becomes 0 A,
    a position detection circuit detecting a zero cross point of a voltage of said position detection phase based on the comparison result by said comparison circuit in response to the fact that said current detection circuit detects that the coil current of said position detection phase becomes 0 A,
    a current interruption circuit interrupting the current flowing into a next position detection phase after a lapse of a predetermined time period since the zero cross point was detected by said position detection circuit, and
    a signal generation circuit generating said PWM signal based on a detection result by said position detection circuit.

2. The motor drive apparatus according to claim 1, wherein
    when the coil current of said position detection phase flows from the coil terminal of said position detection phase toward said neutral point, said current detection circuit decides that the coil current of said position detection phase becomes 0 A in response to the fact that the voltage of the coil terminal of said position detection phase is changed from lower to higher voltage than the voltage of said neutral point after the current of said position detection phase is interrupted by said current interruption circuit, and
    when the coil current of said position detection phase flows from said neutral point, toward the coil terminal of said position detection phase, said current detection circuit decides that the coil current of said position detection phase becomes 0 A in response to the fact that the voltage of the coil terminal of said position detection phase is changed from higher to lower voltage than the voltage of said neutral point after the current of said position detection phase is interrupted by said current interruption circuit.

3. The motor drive apparatus according to claim 1, further comprising
    an adjustment circuit adjusting said predetermined time period so that the time when said current interruption circuit interrupts the coil current of said position detection phase coincides with the time when said current detection circuit detects that the coil current of said position detection phase becomes 0 A.

4. The motor drive apparatus according to claim 1, wherein said current interruption circuit starts clocking said predetermined time period when a time period having lapsed since a latest zero cross point exceeds a time period between a second latest zero cross point and the latest zero cross point.

5. The motor drive apparatus according to claim 1, further comprising a neutral point voltage generation circuit generating a voltage of said neutral point to apply it to said comparison circuit, as based on the voltages of said 3-phase coil terminals.

* * * * *